United States Patent [19]

Kervagoret

[11] 4,085,817
[45] Apr. 25, 1978

[54] POWER STEERING DEVICE

[75] Inventor: Gilbert Kervagoret, Argenteuil, France

[73] Assignee: Societe Anonyme D.B.A., Paris, France

[21] Appl. No.: 717,051

[22] Filed: Aug. 23, 1976

[30] Foreign Application Priority Data

Aug. 21, 1975  France .................................. 75 25864

[51] Int. Cl.² ............................................ B62D 5/08
[52] U.S. Cl. ...................................... 180/132; 60/468; 60/494; 91/448
[58] Field of Search .................. 180/132, 148; 91/451, 91/452, 449, 448, 446; 60/468, 494

[56] References Cited

U.S. PATENT DOCUMENTS

| 3,411,416 | 11/1968 | Herd et al. | 91/452 X |
| 3,878,763 | 4/1975 | Lang | 60/468 |
| 3,941,033 | 3/1976 | Olsen | 91/446 |

Primary Examiner—Joseph F. Peters, Jr.
Assistant Examiner—John A. Pekar
Attorney, Agent, or Firm—Paul David Schoenle; Ken C. Decker

[57] ABSTRACT

A power steering device has a distribution valve inserted between a high pressure source formed by a pump and a reservoir for creating a pressure difference in a fluid motor connected to the steering linkage, in response to application of a torque to the steering shaft of the vehicle, thereby providing assistance to operation of the steering linkage. A by-pass passage connects the high pressure output from the pump with the reservoir and the cross section of the by-pass passage is controlled as a function of the pressure difference between the chambers of the fluid motor. The means for controlling the cross section of the by-pass passage comprise a slidable piston disposed substantially transverse in the path of the fluid flow. The piston comprises grooves and lands for respectively allowing and interrupting fluid flow in the by-pass passage. The axial position of the piston is a function of the pressure difference.

7 Claims, 4 Drawing Figures

POWER STEERING DEVICE

The invention relates to a hydraulic power steering device for a motor vehicle.

A device of this type generally comprises a steering linkage connected to the driving shaft for directing the wheels of the vehicle. The steering linkage is associated with a hydraulic actuator intended to produce a force which assists the movements of said steering linkage in response to rotational operation of the input shaft by an operator. To this end a distribution valve is provided between a high pressure and a low pressure source and comprises two working orifices connected to respective chambers of the hydraulic actuator. The distribution valve, which may be a spool valve, a rotary valve or any other type of valve, operates in response to the application of a torque to the steering shaft, to create a pressure difference between the two chambers of the hydraulic actuator, producing a force of assistance which is transmitted to some part of the steering linkage to facilitate the operation of the vehicle's steering. When no torque is applied to the steering shaft, the distribution valve in in its idle position, and the pressure is the same in both chambers of the hydraulic actuator. This corresponds to the "no assistance" position.

The operation of a distribution valve for a power steering device is illustrated by the shape of a characteristic curve of the valve, which represents the absolute value for the difference between the pressures supplied to the respective chambers of the hydraulic actuator as a function of the torque applied to the steering wheel. This characteristic passes through zero when no torque is applied to the steering wheel, and it is substantially parabolic. In practice, each type of vehicle is equipped with a power steering valve having a different given characteristic, so that it is impossible to make a standard power-steering distribution valve suitable for all types of vehicle.

Moreover, for a given distribution valve of a power steering it is almost impossible to modify the shape of the characteristic curve without changing numerous elements of the device.

An object of the invention is to propose a hydraulic power steering device including a distribution valve suitable for different types of vehicle, said distribution valve including means easily permitting modification of the characteristic of the valve according to the type of vehicle on which said valve is to be mounted.

The invention consists of a hydraulic power steering device for a motor vehicle comprising a hydraulic assisting actuator with a first and a second chambers separated by a movable piston operatively connected to the steering linkage of the wheels of said motor vehicle, at least one of said chambers being supplied with pressure by way of distribution valve responsive to the torque applied to a steering control member to produce a pressure difference between the two chambers of the hydraulic actuator, the distribution valve itself being mounted between a high pressure and a low pressure source, said device also comprising a by-pass passage connected between the high pressure source and the low pressure source and means responsive to the pressure difference between the first and second chambers of the hydraulic actuator to control the flow of fluid through said by-pass passage.

In a preferred embodiment of the invention, the means for controlling the flow of fluid normally define a first cross section in the by-passage, when the pressure difference between the chambers of the hydraulic actuator is substantially zero, the means being responsive to an increase in the pressure difference to interrupt the fluid flow in the by-pass passage, and to permit again fluid flow in said by-pass passage having a second cross-section when the pressure difference exceeds a predetermined value.

The invention will now be described by way of example with reference to the accompanying drawings, in which:

FIG. 1 diagrammatically illustrates a power steering mechanism embodying the invention;

Figure 1:
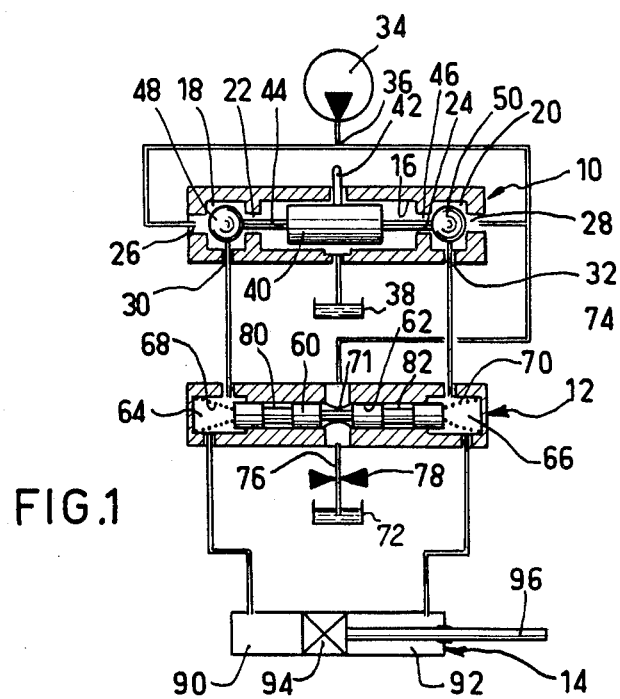

FIG. 1 diagrammatically illustrates a hydraulic power steering mechanism for a motor vehicle, consisting essentially of a distributor 10, a bypass valve 12 and a hydraulic actuator 14.

The distributor 10 contains a central bore 16 and two distribution chambers 18, 20 which form extensions of the central bore 16 and communicate therewith by passages 22, 24 respectively. Each distribution chamber also has an inlet passage 26, 28 respectively and a working passage 30, 32. A line connects the inlet passages 26, 28 to the high pressure orifice of a pressure source 34 which, in this embodiment, is a constant-delivery hydraulic pump.

The bore 16 communicates with a low pressure source 38 formed by a reservoir. A first piston 40 is housed in the bore 16, but fluid can flow between the passages 22, 24 and the reservoir 38 along longitudinal grooves in the piston 40, as will be described below.

A radial pin 42 is introduced into a radial passage in the piston 40 to control the longitudinal motion of the piston. The manner in which the pin 42 is operated will also be described below. The piston 40 also has an axial finger 44, 46 projecting respectively at each end of its faces. The axial fingers 44, 46 normally urge ball valve members 48, 50 respectively disposed in the distribution chambers 18, 20, off the valve seats defined in the passages 22, 24 respectively. When the piston 40 is in the idle position, the ball valve members 48, 50 are in positions enabling fluid to flow between each distribution chamber and both the high pressure source and the central bore 16. Consequently, the two outlet orifices 30, 32 deliver substantially identical average pressures to the chambers of the hydraulic actuator 14.

The bypass valve 12 comprises a second piston 60 in a bore 62 formed in the same housing as that of the distributor. Each end of the second piston 60 opens in a terminal chamber or reaction chamber 64, 66 respectively. The terminal chamber 64 communicates with the distribution chamber 18 and also with one of the chambers 90 of the fluid motor or hydraulic actuator 14; similarly, the terminal chamber 66 communicates with the distribution chamber 20 and also with the other chamber 92 of the fluid motor. A spring 68 located in the terminal chamber 64 biases the piston 60 to the right when considering the figure. Another spring 70 in the terminal chamber 66 biases the piston 60 to the left in the figure.

The piston 60 contains a central groove 71 normally disposed in the flow path of fluid provided between the pump 34 and a reservoir 72, so defining a first leakage section enabling fluid to leak through the line 36 which is in series with a line 74 and a line 76, the latter containing a restrictor 78. The piston also contains two lateral grooves 80, 82 near its ends, so that when the pressure difference between the two terminal chambers generates a force greater than the force of either spring 68, 70, a fluid communication between lines 74 and 76 is again allowed by way of one of the lateral grooves 80 or 82, after said communication has been temporarily interrupted when the outer surface situated between the central groove 71 and one of the above-mentioned lateral grooves was disposed in the fluid path between lines 74 and 76. It should be noted that the lateral grooves 80 and 82 define a second leakage section, and that the maximum value of the second leakage section is less than that of the first leakage section.

The fluid motor 14 comprises the two chambers 90, 92 already mentioned, which are separated by a piston 94. The piston 94 is connected in respect of linear motion to a rod 96 intended to transmit the power assisting force to the steering linkage assembly of the vehicle (not shown).

Figure 2:
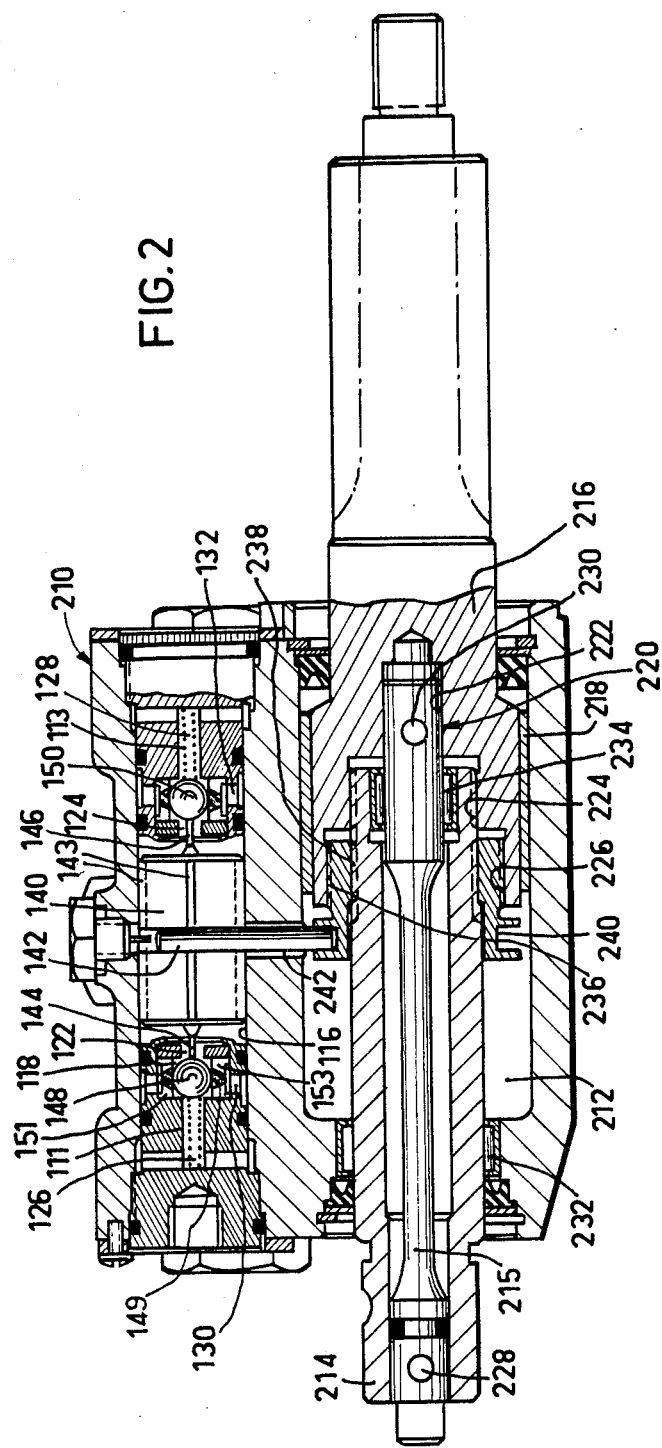
FIG. 2 is a view representing a cross-section of the distributor of the device shown in FIG. 1.

In FIG. 2, which represents a view in cross-section of a control system associated with the distributor shown in FIG. 1, elements like those in FIG. 1 bear the same reference numeral plus 100. The body 210 of a housing contains a cavity 212 which receives an input shaft 214 constituting the input member and connected to rotate with the steering column of the vehicle.

The cavity 212 communicates with the reservoir 38 (not shown). A rack-pinion device 216 coaxial with the input shaft and constituting the output member enters the cavity 212 and is centred by means of a bush 218 fitted to the body 210, where it forms a plain bearing. The left-hand end of the pinion 216 contains a blind bore generally designated 220, said bore being stepped into three parts 222, 224 and 226 of small, medium and large internal diameter respectively. The input shaft 214 penetrates into the medium-diameter part 224 of the blind bore 220. A bore in the central portion of the input shaft contains a torsion bar 215 keyed to the input shaft 214 at 228 and to the output member 216 at 230. The torsion bar penetrates into the small-diameter part of the blind bore 220. The input shaft 214 and pinion 216 are thereby resiliently connected. A needle bearing 232 is provided between the body and the outer periphery of the input shaft to facilitate relative rotation therebetween. Another needle bearing 234 is situated between the torsion bar 215 and the inner periphery of the input shaft 214 in the medium-diameter part 224 of the stepped bore 220. The right-hand end of the input shaft 214 bears on its outer periphery, teeth cooperating with corresponding internal teeth in the medium-diameter part 224 of the stepped bore 220, for restricting relative displacement of the input shaft 214 and pinion 216. Preferably, some plate is permitted between the teeth, but they are arranged so that a relative displacement between the input shaft and pinion is limited to a value for which the torsion bar is not stressed beyond its elastic limit.

The large-diameter part 226 of the blind hole 220 is internally threaded, and a sleeve 236 disposed coaxial to the input shaft 214, is screwed into the threaded part of the bore 220 and can enter into rotation and move longitudinally relative to the pinion 216.

Depending on the characteristics desired for the power steering device, the threaded portion of the bore may be designed to receive a single-thread or multi-thread screw formed on the outer periphery of the sleeve. In addition, longitudinal splines 238 are provided on the inner periphery of the sleeve 236 to cooperate with matching splines on the input shaft, so that the sleeve 236 and input shaft 214 can enter in relative axial motion but not relative rotation. The sleeve 236 has a groove 240 at its outer left periphery, said groove being capable of moving in front of a passage 242 in the housing. The passage 242 connects the cavity 212 to a bore 116 containing the piston 140. A radial pin 142 is inserted in the groove 240 and passes through the passage 242 with clearance, extending into a diametrical bore in the piston 140. The pin 142 connects the sleeve 236 and piston 140 in respect of linear motion, and the space between the walls of the passage 242 and the pin 142 permits slight displacement of the piston 140 in response to a control signal. A plug screwed into the upper part of the housing, terminates by a needle penetrating the diametrical bore in the piston 140, said needle ending close to the upper extremity of the pin for holding the latter in position. One end of the piston 140 ends in a finger or push rod 144 penetrating into a distribution chamber 118 to urge a ball valve member 148 off a valve seat formed in the passage 122. A spring 111 counteracting the push rod 144 urges the ball 148 off another valve seat formed in a passage 126 communicating with the high pressure source. Another spring 113 acts in the same way on the other ball 150 of the distributor. The ball 148 is guided by a central member 149, and channels 151, 153 in this central member communicate the pressure from the power assisting chamber 118 to the associated fluid motor chamber 90 by way of the passage 130. Grooves 143 in the external periphery of the piston 140 allow fluid to flow from the cavity 212 to the distribution chambers. The part of the distribution valve associated with the fluid motor chamber 92 will not be described in detail, since it is identical to the distribution valve associated with the chamber 90. The distributor associated with the distribution chamber operates as follows. When an operator imparts rotational force to the steering wheel, the steering column and the steering shaft 214 are also rotated. A reaction torque is then created in the torsion bar 215. The rotation of the input shaft 214 causes rotation of the sleeve 236 by way of the splines 238. The sleeve is then screwed or unscrewed in the large-diameter part 226 of the stepped blind hole 220 to move longitudinally along its axis of rotation by means of the splines 238. The direction of the sleeve's longitudinal movement depends on the direction of rotation of the input shaft 214. In this description, it will be assumed that the sleeve moves to the left in FIG. 2. The movement of the sleeve 236 to the left causes the piston 140 to be moved in the same direction by the radial pin 142. The push rod 144 formed by an axial finger then urges the valve member 148 off the valve seat defined in the passage 122 to increase the quantity of low-pressure fluid communicated to the distribution chamber 118. On the other hand, the valve member 148 is urged towards the valve seat defined in the passage 126 to reduce the quantity of high pressure fluid communicated to this distribution chamber. Consequently, the fluid pressure delivered by the passage 130 to the fluid motor chamber 90 decreases when the piston 140 is moved to the left. Simultaneously, the fluid pressure delivered by the passage 132 to the fluid motor chamber 92 increases. A pressure difference between the chambers of the fluid motor has been created to assist the manual steering controlled by the rack. If the piston is moved in the other direction, of course, the pressure difference between the fluid motor chambers will give rise to an assisting force in the opposite direction.

Figure 3:
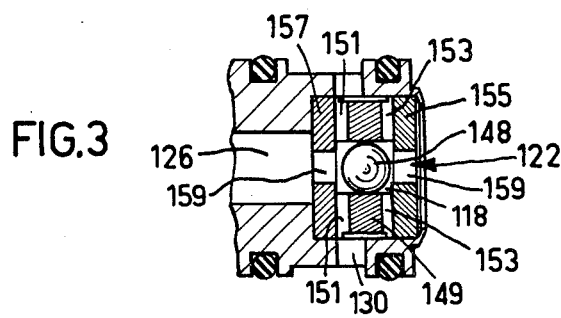
FIG. 3 illustrates an embodiment of the valve of the distributor.

FIG. 3 illustrates an embodiment of the valve in a distribution chamber. Elements identical to those in FIG. 2 are represented by the same reference numerals with the exception of the push rod 144 and weak spring 111 which are not shown. Note that the central member 149 containing the grooves 151, 153 is trapped between two discs 155, 157, each of which contains a calibrated hole 159.

Figure 4:
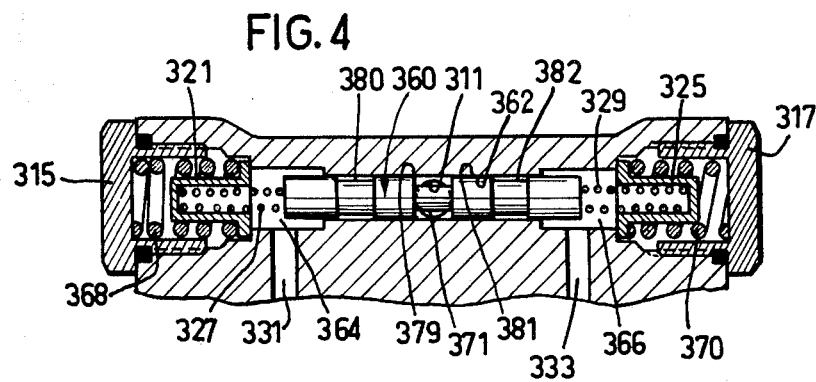
FIG. 4 is a view representing a cross-section of the by-pass valve of the device shown in FIG. 1.

FIG. 4 represents a cross-section through an embodiment of the bypass valve, which is generally designated 12 in FIG. 1 and whose role will be explained in detail below. In FIG. 4, elements identical to those in FIG. 1 bear the same reference numeral plus 300. A passage 311 in a housing communicates with the high pressure source mentioned above and opens into a bore 362. A piston 360 is slidable in the bore 362 and contains a central groove 371, which is normally disposed on the fluid path of the passage 311 to define the first leakage section providing a fluid connection between this passage 311 and a reservoir 72 (not shown) when the piston 360 is in its idle position. Two lateral grooves 380, 382 are defined in the piston 360 on either side of the central groove 371, from which they are separated by respective bearing surfaces 379, 381. The lateral grooves 380, 382 in the piston 360 are intended to define the second leakage section between the passage 311 and reservoir 72, as mentioned above with reference to FIG. 1. Each end of the piston 360 penetrates into a respective terminal or reaction chamber 364, 366. Each reaction chamber 364, 366 communicates with an associated chamber in the fluid motor and also with a distribution chamber in the distributor by way of respective passages 331, 333. Plugs 315, 317 close the left and right-hand ends respectively of the bore 362. A spring 368 supported against the plug 315 biases a cup 321 of which an annular edge engages a shoulder in the terminal chamber 364. Similarly, another spring 370 bears on the plug 317 to urge a cup 325 identical to the cup 321 on to a shoulder in the terminal chamber 366. A weaker spring 327 in the chamber 364 extends into and is supported on the cup 321 and urges the piston 360 to the right in FIG. 4. Likewise, another weak spring 329 in the chamber 366 extends into and is supported against the cup 325, and this spring urges the piston 360 to the left in FIG. 4. The weak springs 327, 329 are provided to keep the piston 360 balanced in its idle position.

The bypass valve operates as follows. When the valve is idle, that is to say, when the steering wheel is stationary, the cross-sections of the fluid passages leading to the distribution chambers from the high pressure and low pressure sources are substantially identical for each distributor, since the ball valve members are equidistant from the valve seats formed in the passages connected to the high pressure. A substantially identical flow rate $q$ of fluid passes through both distributors, and consequently the pressures supplied from each distributor chamber to the reaction chambers 364, 366 and also the associated fluid motor chambers are identical. Also, the central groove 371 in the piston 360 is situated on the leakage passage to define the first leakage section between the pump and the reservoir (not shown), and so permits a certain leakage flow rate $q'$. The total flow rate from the pump is therefore $Q = 2q + q'$. Note also that the discharge of a quantity of fluid to the leakage passage when the distributor is in its idle position allows the pressure from the pump to be reduced, preventing dangerous heating of the liquid in the power steering circuit. Moreover, the leakage of fluid by way of the central groove 371 and resistor 78 (not shown in FIG. 4) enables the sensitivity of the distributor to be modified when the values for the torque applied to the steering whell are near zero, that is, when the central groove is on the leakage path. This has the result of reducing the abruptness of the valve's characteristic curve in the vicinity of zero and rendering it more rounded.

When slight rotary motion is transmitted to the input shaft, a pressure difference is created between the reaction chambers 364, 366 and also between the fluid motor chambers as explained above. Let us assume, for example, that the pressure in the chamber 364 increases whereas the pressure in the chamber 366 decreases. The force acting on the piston 360 and created by the difference between the pressures acting on the ends of the piston 360, causes the latter to move, counteracting the spring 329. The piston 360 penetrates progressively into the reaction chamber 366 in proportion to the increase in the pressure difference, eventually abuting on the cup 325. From this instant, the piston 360 is immobilized in this position, for the force acting on it is now insufficient to move the cup 325 off the shoulder in the chamber 366, overcoming the spring 370. During the movement of the piston 360 to the right, the surface 379 gradually covers the passage 311, interrupting the discharge of fluid through the leakage passage.

The characteristic curve of the power steering valve, which represents the absolute value for the pressure difference between the fluid motor chambers as a function of motion of the piston 140, this value being substantially proportional to the torque applied to the steering wheel, is substantially parabolic. When the pressure difference between the reaction chambers 364, 366, that is to say, between the chambers of the fluid motor, exceeds a predetermined value, the bypass valve shown in FIG. 4 can modify the gradient of the normal characteristic of the power steering valve. Indeed, if the pressure difference between the reaction chambers 364, 366 does become large enough to overcome the force of the spring 370, the piston 360 moves further into the reaction chamber 366, and the groove 380 gradually reveals the leakage passage between the pump and the reservoir 38 (not shown) again before reaching a limit position defining the second leakage section. This reduces the gradient of the substantially parabolic characteristic for high torque values. Note that the change in the gradient of the parabola occurs continuously, since the leakage caused by the groove 380 is progressive during the movement of the piston 360 to the right. Note also that in the embodiment shown in FIG. 4, the central groove is deeper than the lateral grooves, so that the ratio of the first to the second leakage section is of the order of 10.

The shape of the characteristic curve of the power steering valve could also be modified by changing the idle positions of the ball valve members relative to the associated valve seats. This can be done simply by altering the distance to which the distributors are screwed into the housing.

The main parameters which determine the characteristics of the valve are the cross-section of the valve seats, the idle positions of the ball valve members with respect to their corresponding valve seats, the depth of the central and lateral grooves, and the initial tension of the spring resting on the end plugs. In addition, the various assemblies making up the invention can be machined with relatively wide tolerances and can therefore be mass-produced. Thus, the manufacturing tolerances required for the holes in the discs and the depth of the end grooves are of the order of 50 to 100 microns, whereas, for example, the chamfers in the rotor of a rotary power steering valve must be machined to an accuracy of as little as 1 micron. Moreover, it is no longer necessary to use paired components, and each sub-assembly may be replaced in standard fashion without substantially modifying the characteristic of the valve.

It should be noted that the provision of restriction 78 disposed in the fluid line 76 is not compulsory, since in the rest position, fluid communication is already somewhat restricted by the central groove of the needle. However, it has appeared that such restriction is preferable and it has proved that the restriction permits to obtain an improved stability of the needle around its rest position.

It should also be noted that the invention is also applicable to a power steering device comprising a fluid motor having one chamber permanently submitted to the pressure delivered from the pump whereas the pressure in the other chamber is delivered by way of one distributor of the above type. This pressure is variable over and below an idle pressure corresponding to the zero position of the steering shaft. It is clear that, in this case, the needle or piston 360 should be of the differential type with its smaller end surface submitted to the pressure delivered from the pump in said one chamber and its larger end surface submitted to the pressure delivered to the other chamber by way of the distributor. Preferably, the ratio between the larger and smaller end surfaces of the piston is 2. Of course, in this embodiment, only one distributor is used for each fluid motor.

I claim:

1. A hydraulic power steering device for a motor vehicle having a high pressure source and a low pressure source comprising:
    a distribution valve communicating with the high pressure source;
    a hydraulic assisting motor having a piston which substantially defines a first chamber and a second chamber which communicate with said distribution valve such that movement of said distribution valve increases the pressure in one of said first and second chambers and decreases the pressure in the other of said first and second chambers;
    a by-pass passage communicating the high pressure source with the low pressure source; and
    means intersecting said by-pass passage, said means being responsive to a pressure differential between the first and second chambers of said hydraulic assisting motor to move relative to the by-pass passage and to control the flow of fluid through said by-pass passage, said means defining a first cross-section area which normally restricts the flow of fluid through said by-pass passage and a second cross-section area which restricts the flow of fluid through said by-pass passage when said means moves in response to the pressure differential between the first and second chambers to dispose the second cross-section area within said by-pass passage, and said means further including a surface for interrupting the flow of fluid through said by-pass passage when said by-pass passage intersects said means between the first cross-section area and the second cross-section area.

2. A hydraulic power steering device as claimed in claim 1, characterized in that a restrictor is provided in the by-pass passage.

3. A hydraulic power steering device as claimed in claim 1, characterized in that said first cross-section area has a greater leakage value than said second cross-section area.

4. The hydraulic power steering device of claim 1 wherein the means responsive to the pressure differential comprises a slidable piston housed in a bore in a housing, the respective ends of the piston being subjected to the pressures prevailing in the first and second chambers of the hydraulic assisting motor, the slidable piston including a central groove disposed within the fluid flow path of said by-pass passage to thereby define the first cross-section and permit fluid to be communicated from the high pressure source to the low pressure source, when the piston is in an idle position corresponding to a substantially zero pressure differential between the two chambers of the hydraulic motor, the slidable piston being capable of moving upon an increase of the pressure differential between the two chambers of the hydraulic assisting motor to cause the surface on said piston to interrrupt fluid flow in the by-pass passage.

5. The hydraulic power steering device of claim 4 wherein the slidable piston includes lateral grooves defining said second cross-section area on either side of the central groove, each lateral groove being adapted to be disposed in the fluid flow path of said by-pass passage when the pressure differential between the two chambers of the hydraulic assisting motor exceeds a predetermined value.

6. A hydraulic power steering device as claimed in claim 12, characterized in that the slidable piston is movable from the idle position corresponding to a substantially zero pressure differential between the chambers of the hydraulic assisting motor to a first position in which one of its ends is supported on a cup situated at one end of the bore in response to a pressure differential between the chambers of the hydraulic assisting motor, the first position corresponding to interruption of the fluid connection in the by-pass passage, the slidable piston being movable as a whole with the cup towards a second position whereby the fluid communication is again opened by way of one of said lateral grooves when the pressure differential between the two chambers of the hydraulic assisting motor exceeds a predetermined value.

7. A hydraulic power steering device as claimed in claim 6, characterized in that the cup is urged on to a shoulder in the bore by way of a resilient member, the cup being movable by the slidable piston, overcoming the resilient member, when the force acting on the slidable piston and resulting from the pressure difference between the chambers of the hydraulic assisting motor exceeds said predetermined value.

* * * * *